US008050333B2

(12) United States Patent
Muto et al.

(10) Patent No.: US 8,050,333 B2
(45) Date of Patent: Nov. 1, 2011

(54) DATA TRANSFER DEVICE OF SERIALIZER/DESERIALIZER SYSTEM

(75) Inventors: Takashi Muto, Hamura (JP); Yasuhiro Fujimura, Hamura (JP); Keiichi Higeta, Hamura (JP); Junji Baba, Hadano (JP); Takayuki Muranaka, Kawasaki (JP); Isao Kimura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 722 days.

(21) Appl. No.: 11/777,181

(22) Filed: Jul. 12, 2007

(65) Prior Publication Data
US 2008/0013645 A1    Jan. 17, 2008

(30) Foreign Application Priority Data
Jul. 14, 2006  (JP) ................................. 2006-193548

(51) Int. Cl.
H04L 25/00    (2006.01)
(52) U.S. Cl. ........................ 375/257; 375/297
(58) Field of Classification Search .................. 375/245, 375/257, 259, 295, 316, 297, 296, 226, 229, 375/358, 340; 341/60, 58, 59; 398/27, 41, 398/94, 193; 326/22, 83; 327/112
See application file for complete search history.

(56) References Cited

U.S. PATENT DOCUMENTS

| 7,260,057 B2* | 8/2007 | Toyoshima et al. ............ 370/211 |
| 7,363,562 B2 | 4/2008 | Waschura et al. |
| 7,447,260 B2 | 11/2008 | Takahashi |
| 7,535,962 B1* | 5/2009 | Black ............................ 375/254 |
| 7,576,573 B2* | 8/2009 | Nguyen ......................... 327/100 |
| 7,583,753 B2* | 9/2009 | Okamura ....................... 375/296 |
| 2002/0186048 A1* | 12/2002 | Tang et al. ...................... 326/86 |
| 2003/0179016 A1* | 9/2003 | Fujiwara ......................... 327/58 |
| 2003/0206048 A1* | 11/2003 | Toyoshima et al. ............ 327/524 |
| 2004/0264608 A1 | 12/2004 | Habuka et al. |
| 2004/0268190 A1* | 12/2004 | Kossel et al. ................. 714/704 |
| 2006/0253758 A1* | 11/2006 | Matsumoto et al. .......... 714/738 |
| 2009/0290651 A1* | 11/2009 | Okamura ....................... 375/257 |
| 2009/0302923 A1* | 12/2009 | Smeloy et al. ................ 327/307 |

FOREIGN PATENT DOCUMENTS

JP    64-8750    12/1989
(Continued)

OTHER PUBLICATIONS

Japanese Office Action received in Japanese App. No. 2006-193548 (and English translation).

Primary Examiner — Shuwang Liu
Assistant Examiner — Helene Tayong
(74) Attorney, Agent, or Firm — Miles & Stockbridge P.C.

(57) ABSTRACT

In a data transfer device which cancells an offset of a differential amplifier for amplifying a received signal and an offset caused by characteristics of a differential transmission line and selects optimum conditions such as pre-emphasis amount of an output pre-emphasis circuit, a first chip (transmission side LSI=transfer engine 210) and a second chip (reception side LSI=multiplexing engine 330) are connected to each other through differential transmission line 430 and a SerDes (serializer) 401 and a SerDes (deserializer) 402 are used to make signal transmission, so that optimum setting conditions of an offset amount of an offset cancellation circuit included in an input buffer amplifier and a pre-emphasis amount of pre-emphasis circuit included in an output buffer are decided in training using a training PRBS generator 560 and a training PRBS comparator 570.

9 Claims, 9 Drawing Sheets

FOREIGN PATENT DOCUMENTS

| | | |
|---|---|---|
| JP | 08-116340 A | 5/1996 |
| JP | 2004-15622 | 1/2004 |
| JP | 2005-20119 A | 1/2005 |
| JP | 2005-504446 | 2/2005 |
| JP | 2006-60808 | 3/2006 |
| JP | 2006-115488 | 4/2006 |
| WO | WO 02/03964 A2 | 5/2002 |
| WO | WO 2006/009677 A2 | 1/2006 |

* cited by examiner

DATA TRANSFER DEVICE OF SERIALIZER/DESERIALIZER SYSTEM

CLAIM OF PRIORITY

The present application claims priority from Japanese application JP-2006-193548 filed on Jul. 14, 2006, the content of which is hereby incorporated by reference into this application.

BACKGROUND OF THE INVENTION

The present invention relates to a technique which can be effectively applied to cancellation of offsets of an input differential signal and a differential amplifier and an equalization amount of an output pre-emphasis circuit in an inter-LSI (large-scale integrated circuit) data transfer system of a network apparatus and, for example, a technique which can be effectively utilized in the network apparatus and LSIs used in the network apparatus.

Heretofore, in the inter-LSI data transfer system, the technique disclosed in JP-A-2005-20119 and JP-A-8-116340 is used to cancel a DC offset.

However, recently, a serializer/deserializer system in which bus is serialized and signal is transmitted at high speed is being often used in parts requiring the high throughput in the inter-LSI signal transmission. A main reason thereof is that in the conventional parallel transmission the operation frequency is higher the data period is shorter and it seems that timing between bits is relatively largely scattered, so that a margin of timing is small and it is hard to improve the throughput.

The serializer/deserializer system is a transceiver system for transferring data at very high speed. The serializer is a circuit for converting low-speed parallel data into high-speed serial data and transmitting the serialized data from an output buffer. The deserializer is a circuit for restoring high-speed serial data received by an input buffer to original parallel data by means of a clock data recovery circuit incorporated therein. The transceiver system using these circuits is the serializer/deserializer system. In the following description, the serializer/deserializer system is sometimes named SerDes.

SUMMARY OF THE INVENTION

As a result of investigation by the Inventor in order to apply the serializer/deserializer system in the inter-LSI signal transmission, it becomes clear that there are the following problems.

When a signal frequency is very high and a transmission distance is long, so that signal attenuation is increased in the serializer/deserializer system, a signal amplitude of data on a receiver side is very small and, for example, the signal amplitude of 600 mV at a transmitter side is attenuated to 20 mV at an input buffer in a system having a transmission characteristic of an attenuation characteristic of −30 dB. However, an offset of a differential amplifier in a receiving buffer in each channel and an offset between differential signals caused by characteristic difference between transmission lines such as crosstalk between transmission lines are usually 10 mV or more. Since effective input amplitude gets smaller due to the offsets, there arises a problem that the transmission margin is influenced greatly.

Moreover, In high-speed and long-distance signal transmission, transmission data is influenced by data existing before and after the transmission data due to the intersymbol interference (ISI), so that the signal waveform thereof is distorted remarkably. In order to compensate the intersymbol interference, there is the waveform equalization technique which compensates output amplitude by the data existing before and after the transmission data and in which the output pre-emphasis is used to compensate the distortion of the waveform. Heretofore, an optimum set value is set by means of simulation or evaluation of a prototype, although the output pre-emphasis amount is different due to difference of process, temperature and voltage in each channel, so that the waveform distortion cannot be compensated sufficiently and the transmission margin is influenced greatly. Further, since the waveform distortion due to the intersymbol interference depends on a transmission data pattern greatly, it is necessary to calculate the optimum set value using data resemble to actual use conditions, for example, PRBS (pseudo-random bit sequence) pattern.

In order to solve the problems as described above, it is an object of the present invention to provide a technique of calculating an optimum set value of a correction value for offsets of a differential amplifier and a differential signal in each differential channel and an optimum set value of an output pre-emphasis circuit in a high-speed and long-distance differential signal transmission system having increased signal attenuation.

In addition, in the transmission system of the serializer/deserializer system which is synchronized with a clock source, when the signal amplitude is sufficient as compared with offset voltages of an input differential signal and a differential amplifier, influence thereof can be neglected. Accordingly, an equalization amount can be calculated to be set by the general equalization technique, so that desired signal transmission can be attained. Further, the optimum value is subtly different due to variation of transistors and resistors in LSI or difference of temperature and voltage.

However, in an example of a conventional training method of setting the optimum value, there is used a system in which an input data signal on the receiver side is scanned in the time direction using a clock source of LSI on the transmitter side as a reference and a pre-emphasis amount of an output circuit is optimized so that a timing margin with which data can be received exactly is maximized, it is understood that in a transmission system of the serializer/deserializer system in which the clock source is asynchronous (network system in which the clock source on the transmitter side LSI is different from that on the receiver side LSI) it is difficult to calculate the optimum set value by which the timing margin is maximized by the scanning in the time axial direction.

In order to solve the problems as described above, it is an object of the present invention to provide a technique of setting an optimum set value for a pre-emphasis amount of an output pre-emphasis circuit and calculating optimum set values of parameters such as output amplitude in the signal transmission system of the serializer/deserializer system in which the clock source is asynchronous.

The above and other objects and novel features of the present invention will be apparent from the following description of the specification taken in connection with the accompanying drawings.

An outline of representative aspects of the present invention disclosed in this application is as follows.

That is, in a system using a serializer/deserializer system like a network apparatus to make high-speed and long-distance differential signal transmission, a transfer system includes training in which PRBS (pseudo-random bit sequence) patterns resemble to transmission data in normal operation are transmitted in each transmission channel when apparatus is started or when environmental conditions such as power supply voltage are varied and parameters of an offset amount of a differential amplifier for amplifying a received signal and a pre-emphasis amount (signal emphasis degree) of an output pre-emphasis circuit are assigned to each transmission channel, so that results of PASS/FAIL are totalized to select optimum conditions for each transmission channel so as to correct an offset of the differential amplifier and an offset caused by characteristics of a differential transmission line and the pre-emphasis amount of the output pre-emphasis circuit.

Effects obtained by the representative aspects of the present invention disclosed in this application are as follows:

Since the optimum set values for the offsets of the differential amplifier and the transmission system and the pre-emphasis amount of the output pre-emphasis circuit can be selected for each channel, the high-speed and long-distance signal transmission margin can be expanded. Further, even in an asynchronous signal transmission system, the offsets of the differential amplifier and the differential signal can be also corrected and the optimum set value for the pre-emphasis amount of the output pre-emphasis circuit can be also detected.

Other objects, features and advantages of the invention will become apparent from the following description of the embodiments of the invention taken in conjunction with the accompanying drawings.

DETAILED DESCRIPTION OF THE INVENTION

Embodiments of the present invention are now described with reference to the accompanying drawings.

A. Whole Configuration of System

Figure 1:
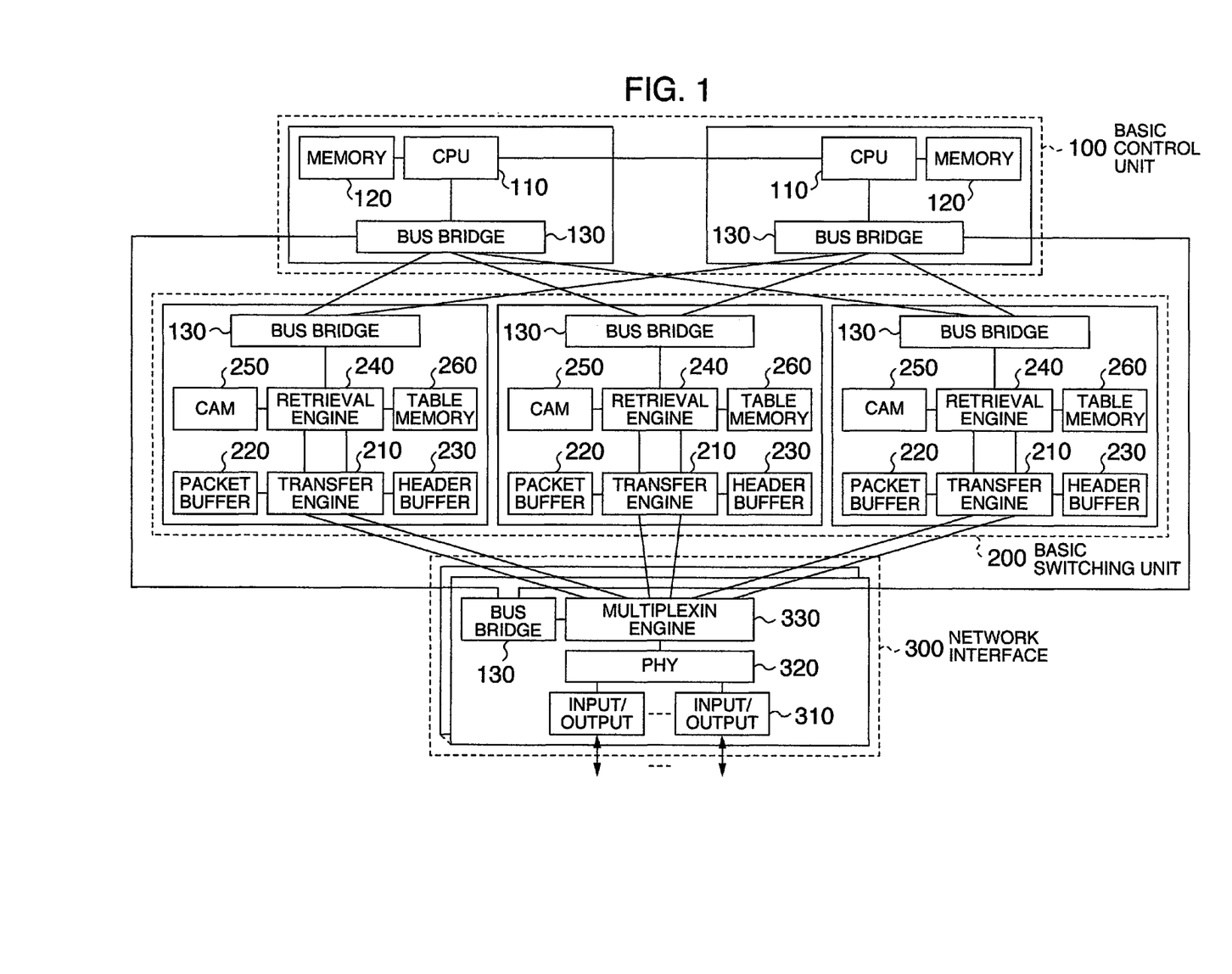
FIG. 1 is a block diagram schematically illustrating a network apparatus according to an embodiment of the present invention.

FIG. 1 is a block diagram schematically illustrating an example of a network apparatus to which the present invention is applied. The system includes three main units containing a basic control unit 100, a basic switching unit 200 and a network interface 300. In FIG. 1, the basic control unit 100 is configured to a redundant system of 1+1 and the basic switching unit 200 is configured to a redundant system of 2+1, by way of example. The basic control unit 100 performs management of the apparatus, control of interfaces between units and the like and includes a central processing unit (CPU) 110, a main memory 120 and a bus bridge 130. The bus bridge 130 is provided in each unit and the access of each unit to the CPU 110 is made through the bus bridge 130. The basic switching unit 200 performs transfer function, retrieval function and filtering function and includes transfer engines 210 and retrieval engines 240. A packet buffer 220 and a header buffer 230 are connected to each transfer engine 210. A content addressable memory (CAM) 250 for route, filter/QoS (quality of service) tables and a table memory 260 for storing various tables are connected to each retrieval engine 240. The network interface 300 is an input/output port connected to a network and includes an input/output module 310, a physical layer chip (PHY) 320 and a multiplexing engine 330. In the network apparatus shown in FIG. 1, the three units containing the basic control unit 100, the basic switching unit 200 and the network interface 300 are mounted in respective independent printed circuit boards and are connected to one another by means of a backplane board or cable.

The processing flow of the apparatus is now described briefly. When packets arrive at the input/output module 310 from the network, the packets are converted into digital signals by the PHY 320 which performs the signal conversion processing of a physical layer and are subjected to line concentration processing by the multiplexing engine 330 to be sent to the transfer engine 210. The transfer engine 210 stores data information contained in the packets into the packet buffer 220 and header information contained therein into the header buffer 230. For example, the header part of the Internet Protocol (IP) packet contains information such as reception destination address, transmission source address and data length. The retrieval engine 240 receives the header information from the transfer engine 210 and acquires information necessary to control transfer of the packets with reference to various tables. Tables referred by the retrieval engine 240 contain a route table and a filter/QoS table. The route table is a table used to perform the route retrieval processing and the filter/QoS table stores information such as filtering conditions and discard conditions of packets and priority of transfer processing in the apparatus. The information is referred using the retrieval result of entry to the CAM 250 for route, filter/QoS tables. The control information acquired from the result is returned from the retrieval engine 240 to the transfer engine 210. The transfer engine 210 designates a route to transfer the packets and transmits the packets through the multiplexing engine 330, the PHY 320 and the input/output module 310 defined by the designated route to the network.

B. Signal Transmission System

Figure 2:
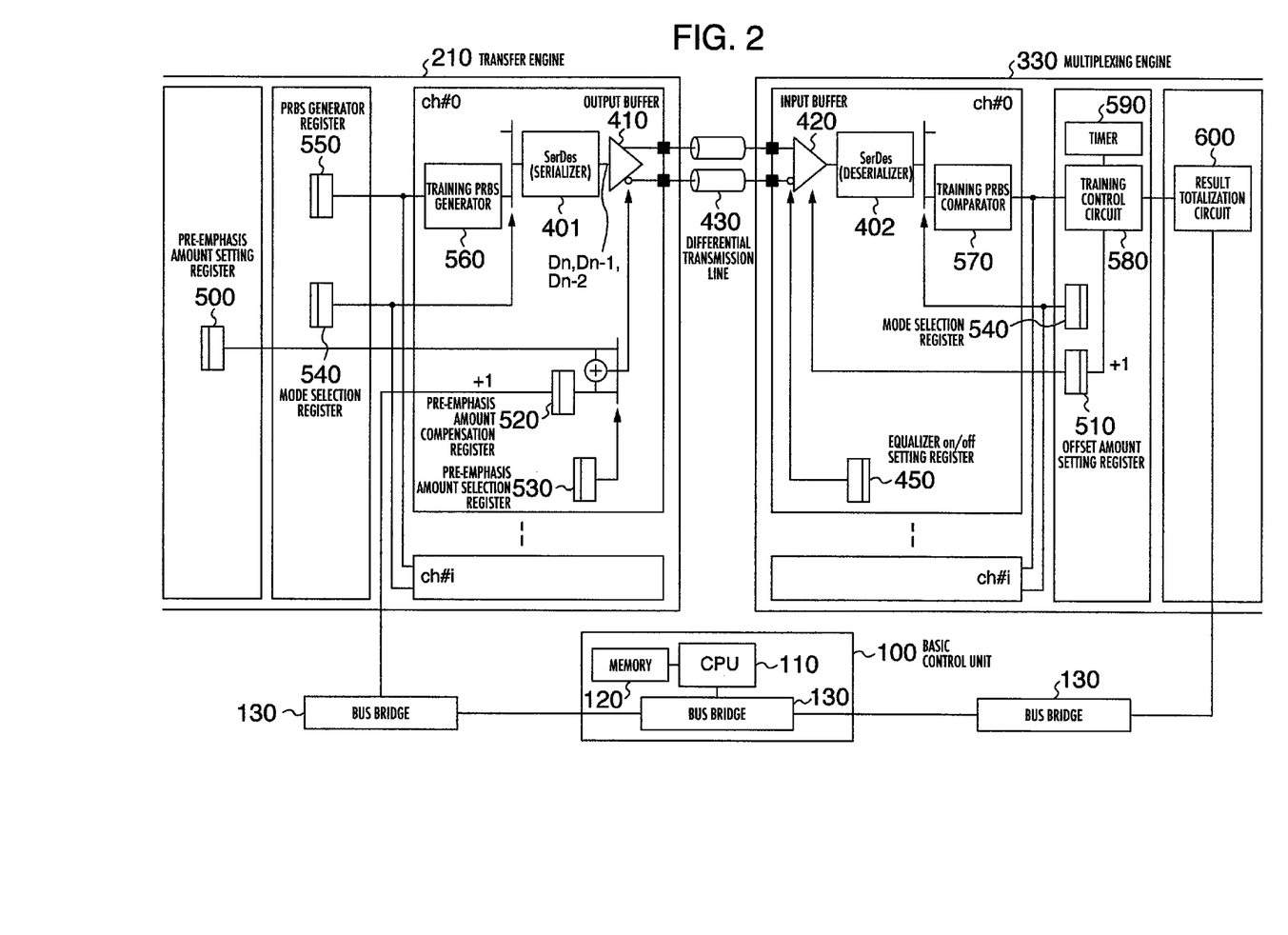
FIG. 2 is a block diagram schematically illustrating a signal transmission system using the technique of the present invention.

FIG. 2 schematically illustrates an example of a signal transmission system using the technique of the present invention and including the transfer engine 210 and the multiplexing engine 330 connected to each other through a differential transmission line 430. The transfer engine 210 includes channels #0 to #i and an output buffer 410 of each channel is connected to a SerDes serializer 401. The SerDes serializer 401 is supplied with data from a training PRBS generator or normal data selected by a mode selection register 540. Further, a pre-emphasis amount set in a pre-emphasis amount setting register 500 and a correction amount for each transmission distance set in a pre-emphasis amount correction register are added to be set to the output buffer 410 as a pre-emphasis amount. The multiplexing engine 330 includes channels #0 to #i and an input buffer 420 of each channel is connected to a SerDes deserializer 402. An output of the SerDes deserializer 402 is selected by a training PRBS comparator or a logical mode selection register 540 normally to be outputted. An offset amount and an on/off of an equalizer are set to the input buffer 420 by an offset amount setting register 510 and an equalizer on/off setting register 450, respectively, and the input buffer 420 is connected to the training PRBS comparator 570. An output of the training PRBS comparator 570 is connected to a training control circuit 580 connected to a timer 590 and results thereof are totalized by a result totalization circuit 600.

Differential buffers are used in the output buffer 410 and the input buffer 420 and a differential transmission line 430 is used in a transmission line. When high-speed (high frequency) and long-distance signal transmission is made, a differential signal received by the input buffer 420 is distorted due to the intersymbol interference and the transmission loss in the transmission system and the amplitude of the differential signal is very small, so that influence of the offset between the differential signals (between positive and negative polarities) received by the input buffer cannot be neglected. Accordingly, there is a problem that high-speed operation and long-distance transmission are impeded.

The offset is caused by difference in the offset characteristics due to difference in manufacturing of elements paired in a differential amplifier circuit of the input buffer and difference in the characteristics between positive and negative polarity sides of the differential transmission line 430. Accordingly, in the present invention, these differences are absorbed by correcting the pre-emphasis amount of the output buffer 410 and the offset of the differential amplifier of the input buffer 420.

C. Output Buffer

Figure 3:
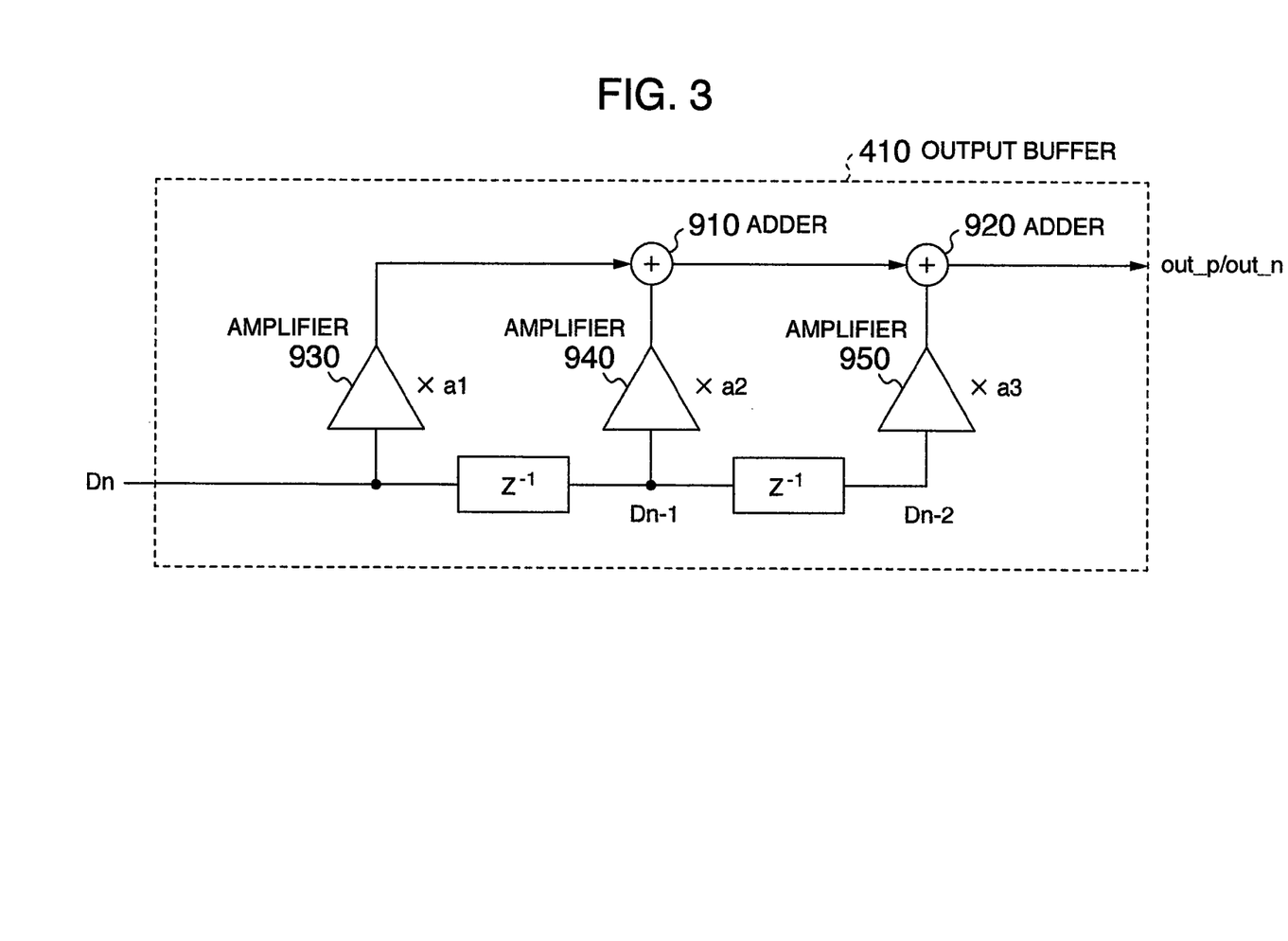
FIG. 3 is a block diagram illustrating an output buffer including a pre-emphasis amount adjustment circuit.
Figure 4:
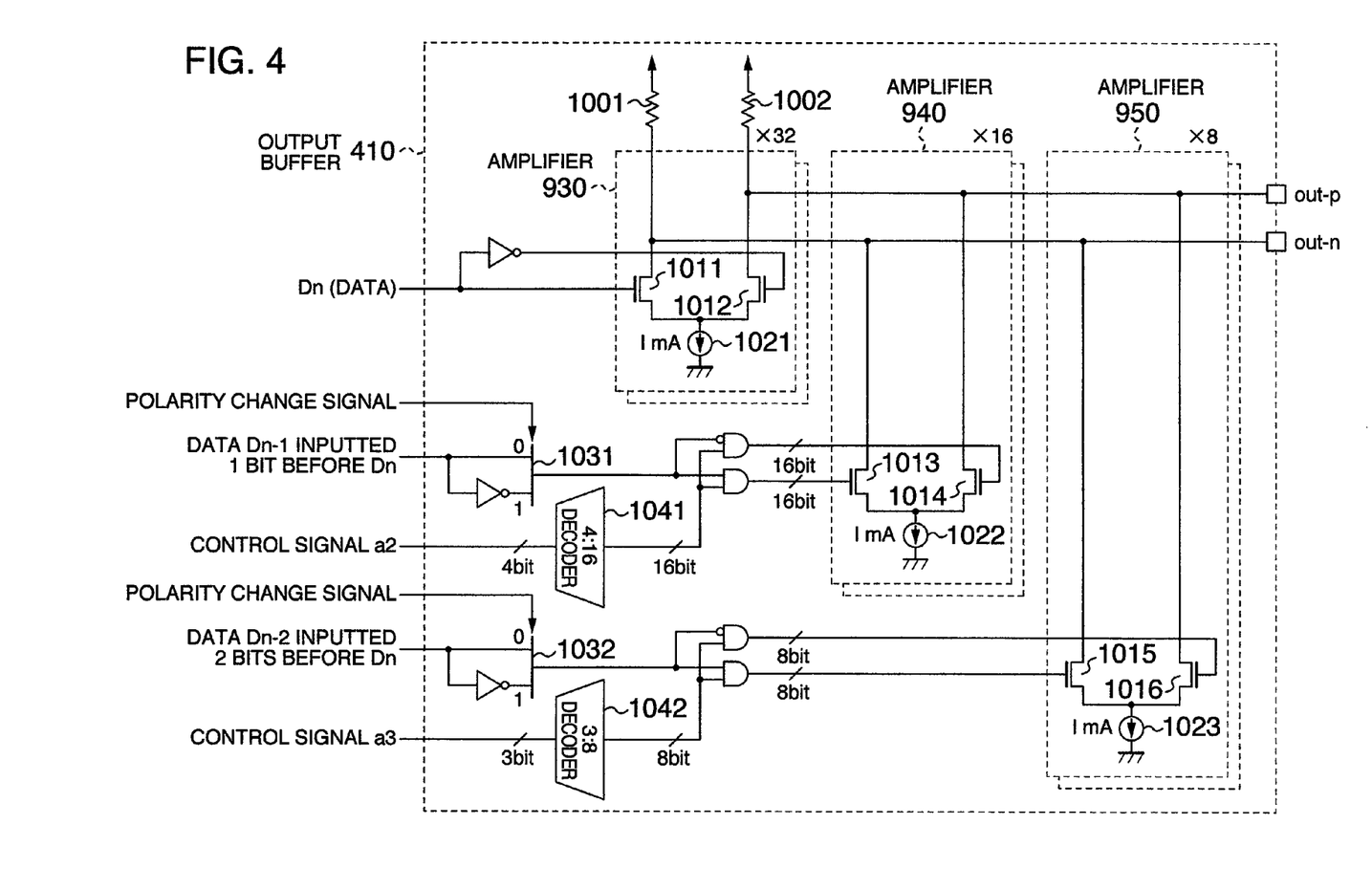
FIG. 4 is a circuit diagram illustrating an example of a concrete circuit of the output buffer shown in FIG. 3.

FIG. 3 is a block diagram illustrating the output buffer 410 including the pre-emphasis amount adjustment circuit of FIG. 2 and FIG. 4 is a circuit diagram illustrating an example of a concrete circuit of the output buffer 410 of FIG. 2. An inputted signal Dn is amplified to a1 times by an amplifier 930, data Dn-1 inputted one bit before the signal Dn is amplified to a2 times by an amplifier 940 and data Dn-2 inputted two bits before the signal Dn is amplified to a3 times by an amplifier 950. Outputs of the amplifiers 930, 940 and 950 are added by adders 910 and 920 to be outputted. By controlling a1, a2 and a2 externally, the pre-emphasis amount can be controlled. An output voltage level of the output buffer 410 can be emphasized by the pre-emphasis in accordance with the frequency characteristic of transmission loss in the transmission system so that signals received by the input buffer 420 can be uniformed.

In the concrete circuit shown in FIG. 4, 32 amplifiers 930 each having MOSFETs 1011 and 1012 and a constant current source 1021 are connected in parallel to terminals out_p and out_n. 16 amplifiers 940 each having MOSFETs 1013 and 1014 and a constant current source 1022 are connected in parallel to the terminals out_p and out_n. A 4-bit control signal a2 is decoded by a 4:16 decoder 1041 into 16 signals and the 16 decoded signals are supplied to gates of the MOSFETs 1013 and 1014, so that the number of 16 parallel amplifiers to be operated is controlled in accordance with the 16 decoded signals to thereby decide the emphasis amount. 8 amplifiers 950 each having MOSFETs 1015 and 1016 and a constant current source 1023 are connected in parallel to the terminals out_p and out_n. A 3-bit control signal a3 is decoded by a 3:8 decoder 1042 into 8 signals and the 8 decoded signals are supplied to gates of the MOSFETs 1015 and 1016, so that the number of 8 parallel amplifiers to be operated is controlled in accordance with the 8 decoded signals to thereby decide the emphasis amount. The MOSFETs 1011, 1012, 1013, 1014, 1015 and 1016 are configured by circuits having the same characteristic. Further, the constant current sources 1021, 1022 and 1023 are also configured by circuits having the same characteristic. Thus, the numbers of parallel amplifiers 940 and 950 to be operated can be controlled by the control signals a2 and a3, respectively, to thereby control the pre-emphasis amount arbitrarily. As a concrete example, when the numbers of parallel amplifiers 940 and 950 are 16 and 8, respectively, a1 is set to 32 times, a2 to 16 times and a3 to 8 times, that is, the pre-emphasis of 1:0.5:0.25 can be set. An added value of the values in the pre-emphasis amount setting register and the pre-emphasis amount correction register of FIG. 2 is connected to the control signals a2 and a3 of FIGS. 3 and 4 to be controlled. The polarity of the control signals a2 and a3 is reversed by switching a polarity change signal register 1031 of FIG. 4

D. Input Buffer

Figure 5:
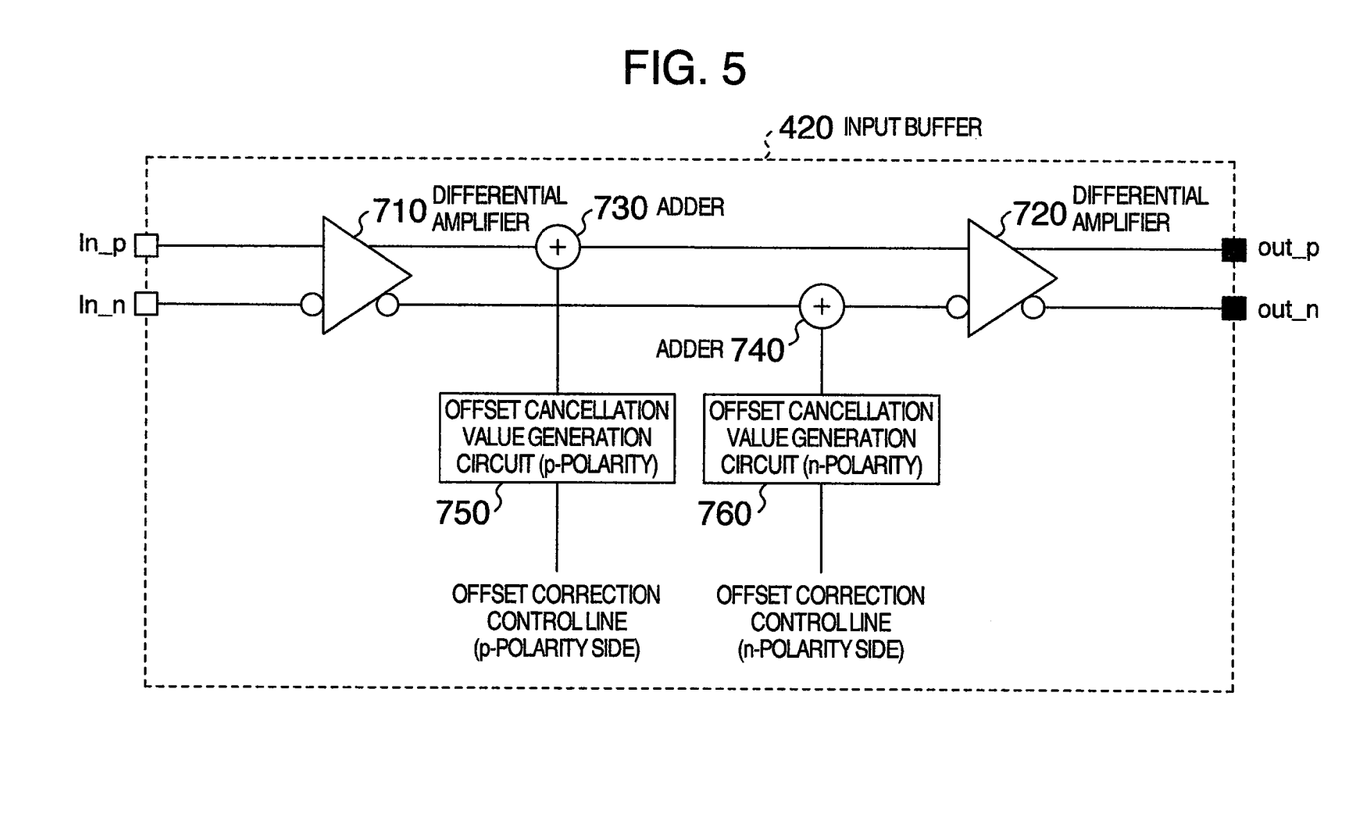
FIG. 5 is a block diagram illustrating a differential input buffer including an offset cancellation circuit.
Figure 6:
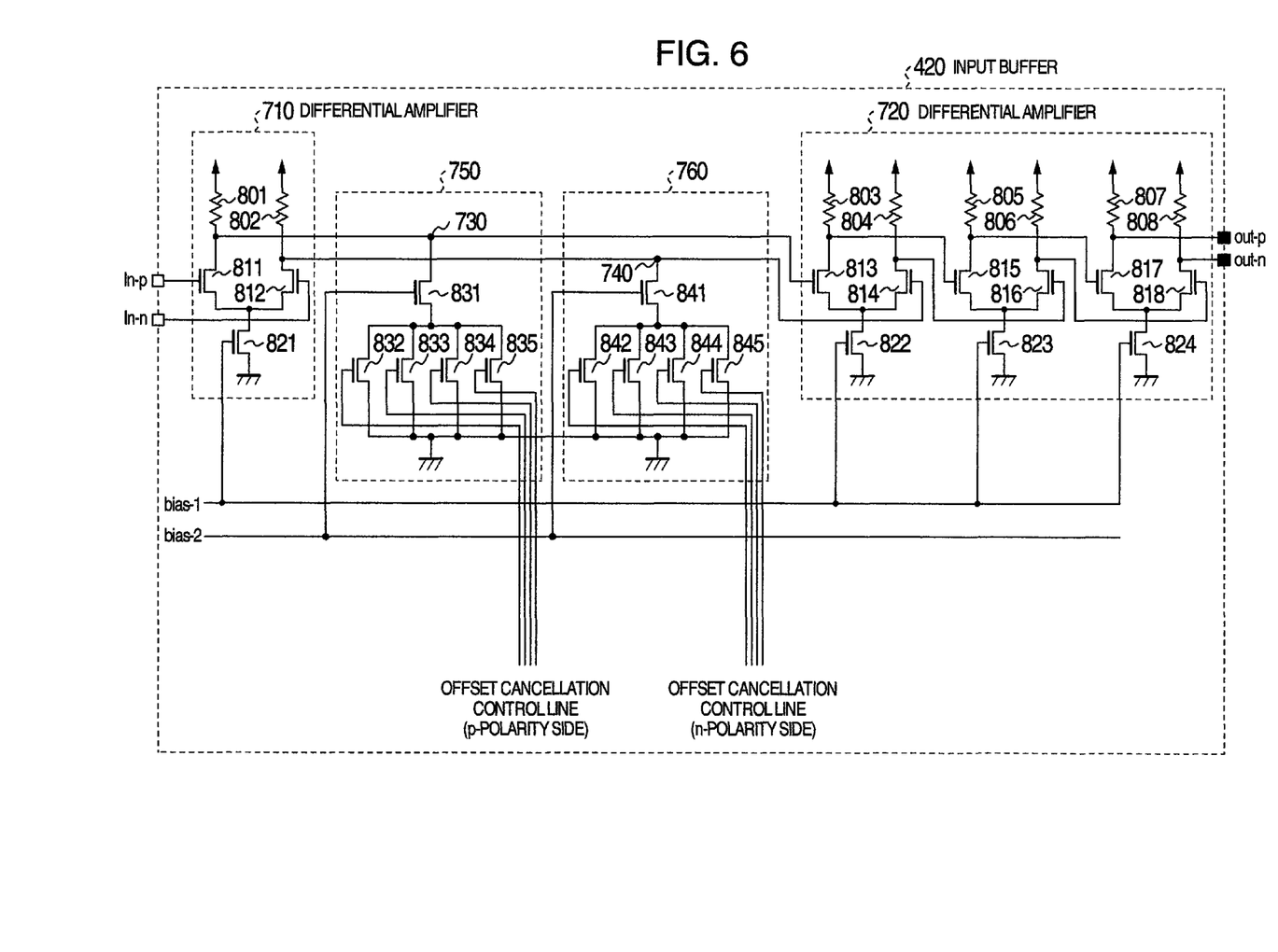
FIG. 6 is a circuit diagram illustrating an example of a concrete circuit of the input buffer shown in FIG. 5.

FIG. 5 is a block diagram illustrating the input buffer 420 of FIG. 2 and FIG. 6 is a circuit diagram illustrating an example of a concrete circuit of the input buffer 420 of FIG. 2. Differential signals inputted from terminals in_p and in_n are buffered by a differential amplifier 710 to be connected to a differential amplifier 720. Cancellation values generated by offset cancellation value generation circuits are added to differential outputs of the differential amplifier 710 by adders 730 and 740 to thereby cancel the offsets. In the concrete circuit of FIG. 6, offset cancellation value control lines (p-polarity side) connected to MOSFETs 832 to 835 and offset cancellation value control lines (n-polarity side) connected to MOSFETs 842 to 845 are turned on and off to pull out currents from nodes p1 and n1 of the input amplifier 420 to thereby cancel the offsets. Thus, difference between the offset characteristics of the differential amplifiers of the input buffer caused by scattering in manufacturing can be absorbed.

Figure 7:
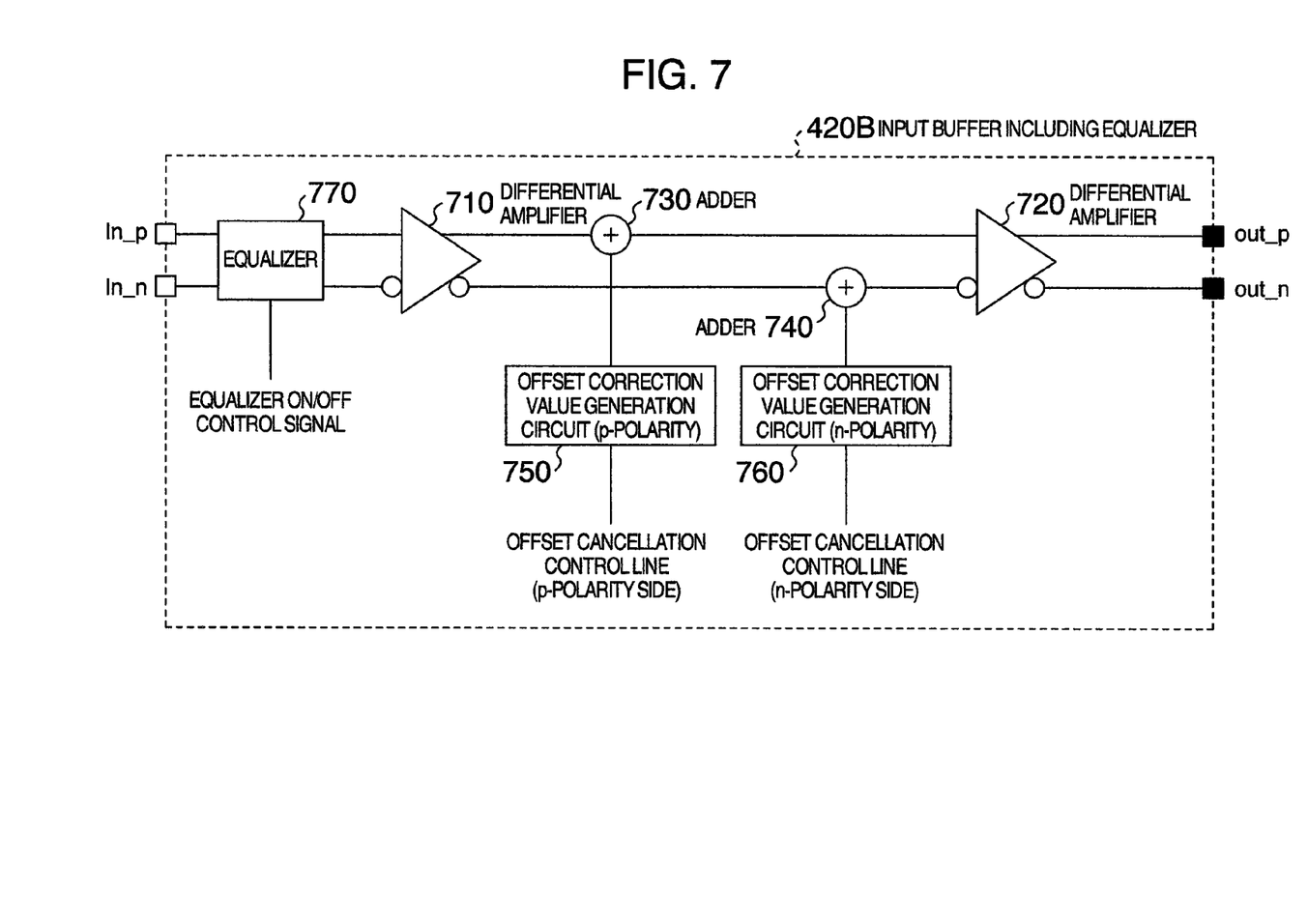
FIG. 7 is a block diagram illustrating a differential input buffer including an offset cancellation circuit and an equalizer on/off circuit.

FIG. 7 is a block diagram illustrating the input buffer 420 of FIG. 5 including an equalizer 770 added thereto. The equalizer 770 increases gain in only a specific frequency band in accordance with the frequency characteristic of transmission loss in the transmission system to uniform a signal amplitude received by the input buffer 420. An equalizer on/off control signal can be turned on and off to thereby make equalization on the reception side.

A value of the offset amount setting register of FIG. 2 is connected to the offset cancellation control lines (p-polarity side and n-polarity side) shown in FIGS. 5 and 6 to be controlled.

E. Flow Chart of Training

Figure 8:
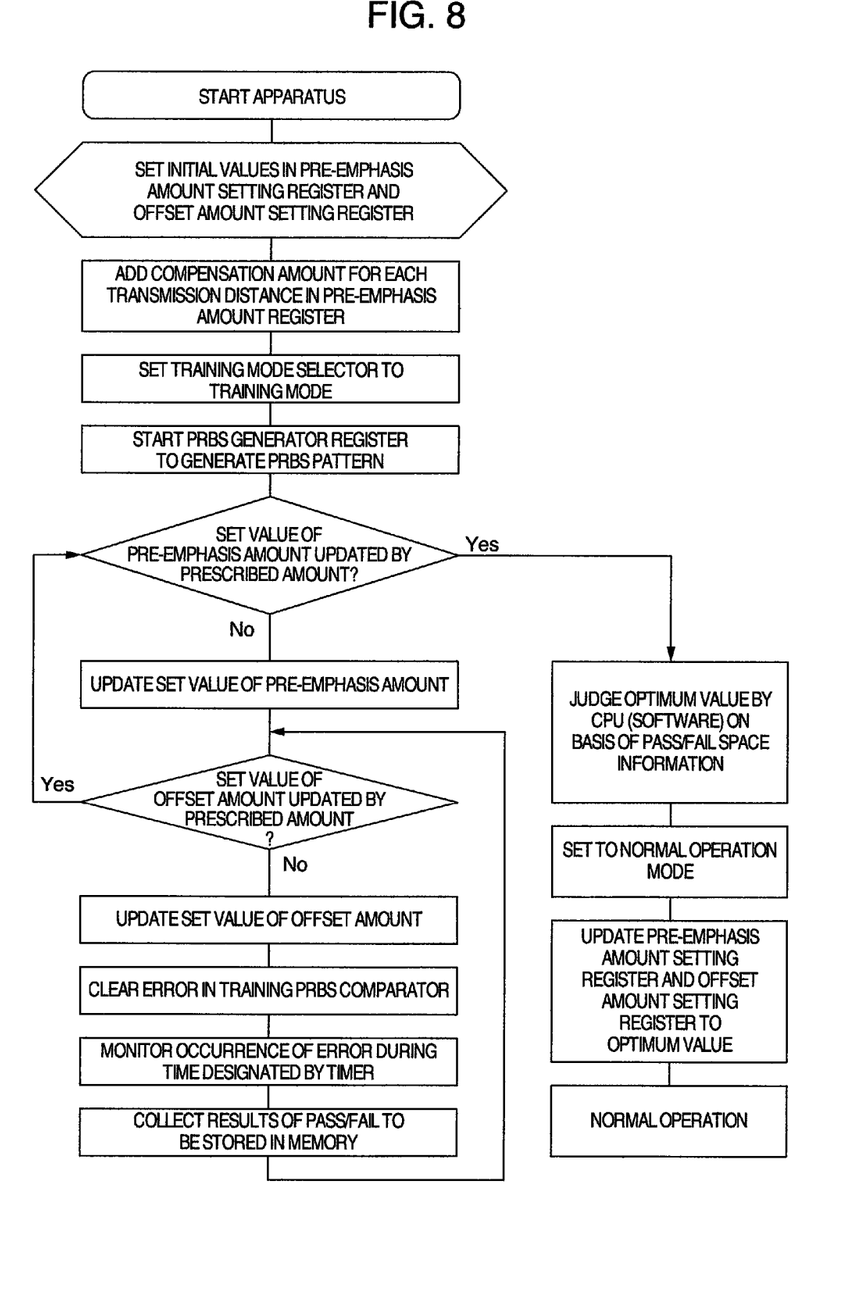
FIG. 8 is a flow chart showing a training procedure of an apparatus.

Referring now to a flow chart of FIG. 8 showing a training procedure of the apparatus, the training procedure is described. When the apparatus is started, initial values are set in the pre-emphasis amount setting register 500 and the offset amount setting register 510. Added value of cancellation amount (e.g. set difference between a short distance and a long distance) for each transmission distance is set in the pre-emphasis amount compensation register 520. Thereafter, the mode selection register 540 is set to a training mode and a PRBS generator register 550 is started, so that PRBS patterns are generated by the training PRBS generator 560 and the training is started. The PRBS patterns are sent through the output buffer 410, the differential transmission line 430 and the input buffer 420 to the training PRBS comparator 570. The training control circuit 580 clears error in the training PRBS comparator 570 and examines pattern comparison results during the time designated in the timer 590. The training PRBS generator 560 and the training PRBS comparator 570 generate patterns in accordance with the same algorithm. Consequently, it can be judged whether the patterns generated by the training PRBS generator 560 and sent to the training PRBS comparator is coincident with the patterns generated by the training PRBS comparator 570 or not. The results of PASS/FAIL by examination of the pattern comparison results are totalized by the result totalization circuit 600 and sent through the bus bridge 130 to the CPU 110 of the basis control unit 100 to be written into the main memory 120. The above description made so far is the brief training operation. The training control circuit 580 updates the amount in the offset amount setting register 510 and performs examination of pattern comparison results, totalization of results and writing into memory repeatedly. When the offset amount reaches a maximum set amount, the amount in the pre-emphasis amount compensation register 520 is updated by the CPU 110 through the bus bridges 130 and the examination of pattern comparison results, the totalization of results and the writing into memory are performed repeatedly. When the pre-emphasis amount reaches a maximum set value, the training is ended. The results of PASS/FAIL acquired by the series of training operation are stored in the main memory 120 as PASS/FAIL space information. The CPU 110 (software) judges the optimum value on the basis of the space information. The series of training operation is performed for each channel to set the optimum values for all channels.

Figure 9:
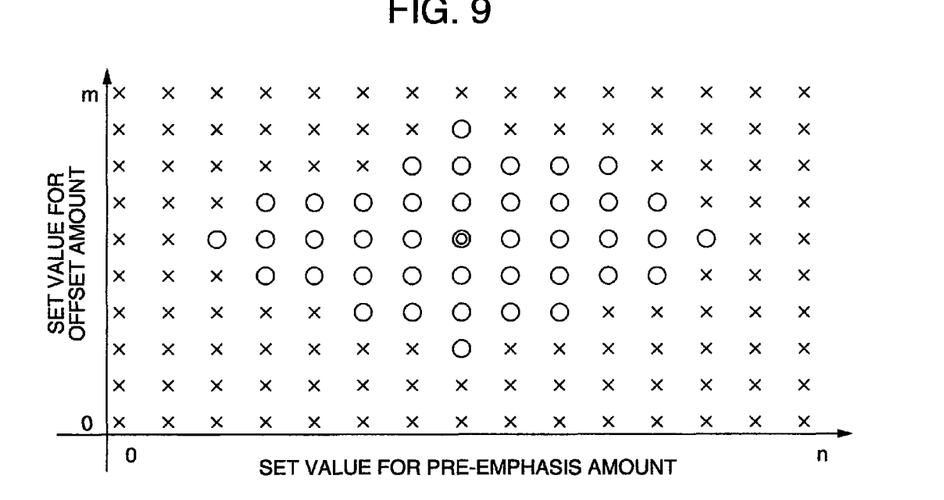
FIG. 9 is a diagram showing an optimum amount of PASS/FAIL space in an image manner.

FIG. 9 is a diagram showing the optimum value in the PASS/FAIL space in an image manner. In judgment of the optimum value, a set value for the pre-emphasis amount and a set value for the offset amount shown by ⊚ which is a center value in the space of PASS "○" or "⊙" and FAIL "X" are selected. When the training is ended, the mode selection register 540 is set to normal mode and values in the pre-emphasis amount compensation register 520 and the offset amount setting register 510 are updated to the optimum values, so that normal operation is started.

As described above, according to the present invention, the optimum set values for the pre-emphasis amount and setting of on/off of the equalizer are not calculated in advance by simulation or prototype evaluation. Instead, when the apparatus is started, PRBS pattern resemble to transmission data is transmitted in each transmission channel and transmission condition parameters such as the offset amount of the input buffer 420 and the pre-emphasis amount of the output buffer 410 are varied, so that the results of PASS/FAIL are totalized to calculate the optimum transmission condition parameter. Accordingly, difference in manufacturing of the differential transmission line 430 can be coped with, so that the very high-speed transmission can be attained. In addition, even variation in use environment such as temperature and voltage of the differential transmission line 430 can be coped with, so that the very high-speed transmission can be attained.

Further, according to the present invention, since the pre-emphasis amount of the output buffer 410 and the offset amount of the input buffer 420 are optimized using them as parameters instead of deciding the optimum set value from the PASS/FAIL information in the time axial direction as in the prior-art training, the very high-speed transfer can be attained even in the asynchronous (network apparatus in which the clock source on the transmission side LSI is different from that on the reception side LSI and there is a time lag) serializer/deserializer system.

A embodiment of the present invention has been described with reference to FIGS. 1 to 9. The technique of the present invention can be applied to not only the network apparatus but also circuits which perform differential transmission such as the SerDes and all apparatuses using the circuits. Further, the present invention is not limited to the embodiment described above and can adopt various embodiments and aspects without departing from the scope of the invention.

The invention claimed is:

1. A data transfer device comprising:
a first circuit;
a second circuit; and
a differential transmission line,
wherein the first circuit includes a serializer to convert a parallel signal into a serial signal, a pseudo-random number generator to generate pseudo-random patterns in accordance with a predetermined algorithm, and an output buffer to selectively output the serial signal to the differential transmission line as an input signal thereto,
wherein the second circuit includes a deserializer to convert the serial signal into the parallel signal, an input buffer to amplify signals inputted from the differential transmission line by a differential amplifier and to supply the signals to the deserializer and a comparator,
wherein the comparator compares the pseudo-random patterns inputted from the differential transmission line with patterns generated in accordance with the predetermined algorithm to produce a comparison result thereof, and
wherein a pre-emphasis amount of the output buffer and an offset amount of said differential amplifier are scanned, an output of the comparator is obtained for each combination of pre-emphasis amount of the output buffer and offset amount of said differential amplifier, and the pre-emphasis amount of the output buffer and the offset amount of said differential amplifier are determined in accordance with an amount of coincidence/non-coincidence between the pseudo-random patterns inputted from the differential transmission line and the pseudo-random patterns generated by the comparator in accordance with the predetermined algorithm.

2. The data transfer device according to claim 1, wherein the output buffer includes a plurality of amplifiers and adders and the amplifiers amplify the input signal and have variable gain,
the adder adds outputs of the amplifiers and outputs to the differential transmission line,
the gain being varied to adjust the pre-emphasis amount.

3. The data transfer device according to claim 1, wherein the output buffer includes a plurality of differential amplifiers and
the amplifiers amplify the input signal,
the number of parallel differential amplifiers being changed to adjust the pre-emphasis amount.

4. A data transfer device comprising:
a first circuit;
a second circuit; and
a differential transmission line,
wherein the first circuit includes a serializer to convert a parallel signal into a serial signal, a pseudo-random number generator to generate pseudo-random patterns, and an output buffer to selectively output the serial signal to the differential transmission line as an input signal thereto,
wherein the second circuit includes a deserializer to convert the serial signal into the parallel signal, an input buffer to amplify signals inputted from the differential transmission line and to supply the signals to the deserializer and a comparator,
wherein the input buffer includes a differential amplifier to amplify signals inputted from the differential transmission line, wherein the comparator compares the pseudo-random patterns inputted from the differential transmission line with patterns generated in accordance with the predetermined algorithm to produce a comparison result thereof, and wherein a pre-emphasis amount of the output buffer and an offset amount of said differential amplifier are scanned, an output of the comparator is obtained for each combination of pre-emphasis amount of the output buffer and offset amount of said differential amplifier, and the pre-emphasis amount of the output buffer and the offset amount of said differential amplifier are determined in accordance with an amount of coincidence/non-coincidence between the pseudo-random patterns inputted from the differential transmission line and the pseudo-random patterns generated by the comparator in accordance with the predetermined algorithm.

5. The data transfer device according to claim 4, wherein the input buffer includes a plurality of MOSFETs connected in parallel to MOS transistor, and the plurality of MOSFETs are turned on and off to adjust the offset of the differential amplifier.

6. The data transfer device according to claim 4, wherein the input buffer includes an equalizer which varies gain in a specific frequency band in accordance with frequency characteristic of transmission loss in the differential transmission line, and whether the equalizer is operated or not is decided on the basis of the comparison result.

7. The data transfer device according to claim 4, wherein the first circuit is provided within a network interface constituting an input/output port connected to a network.

8. The data transfer device according to claim 4, wherein the second circuit is provided within a basic switching unit which performs transfer function, retrieval function and filtering function.

9. The data transfer device according to claim 4, wherein the first and second circuits are mounted on different printed circuit boards, respectively.

* * * * *